United States Patent [19]

Bowers et al.

[11] Patent Number: 5,107,346
[45] Date of Patent: Apr. 21, 1992

[54] PROCESS FOR PROVIDING DIGITAL HALFTONE IMAGES WITH RANDOM ERROR DIFFUSION

[75] Inventors: Henry Bowers, Oakland; John S. Bowers, San Francisco, both of Calif.

[73] Assignee: Bowers Imaging Technologies, Inc., South San Francisco, Calif.

[21] Appl. No.: 509,602

[22] Filed: Apr. 13, 1990

Related U.S. Application Data

[63] Continuation-in-part of Ser. No. 257,843, Oct. 14, 1988, and Ser. No. 421,931, Oct. 16, 1989.

[51] Int. Cl.[5] .............................................. H04N 1/40
[52] U.S. Cl. .................................... 358/447; 358/455; 358/458; 358/463
[58] Field of Search ............... 358/457, 298, 455, 458, 358/459, 463, 447; 382/22, 50, 56, 55; 364/518

[56] References Cited

U.S. PATENT DOCUMENTS

| | | | |
|---|---|---|---|
| 3,977,007 | 8/1976 | Berry et al. | 346/1 |
| 4,032,978 | 6/1977 | Wong | 358/283 |
| 4,280,144 | 7/1981 | Bacon | 358/280 |
| 4,339,774 | 7/1982 | Temple | 358/283 |
| 4,345,313 | 8/1982 | Knox | 364/515 |
| 4,393,452 | 7/1983 | Sekigawa | 364/514 |
| 4,449,150 | 5/1984 | Kato | 358/456 |
| 4,470,065 | 9/1984 | Reitmeier | 358/21 R |
| 4,544,922 | 10/1985 | Watanabe et al. | 340/728 |
| 4,569,081 | 2/1986 | Mintzer et al. | 382/47 |
| 4,578,713 | 3/1986 | Tsao et al. | 358/283 |
| 4,587,621 | 5/1986 | DuVall | 364/577 |
| 4,595,948 | 6/1986 | Itoh et al. | 358/75 |
| 4,610,026 | 9/1986 | Tabata et al. | 382/47 |
| 4,611,349 | 9/1986 | Hou | 382/47 |
| 4,616,268 | 10/1986 | Shida | 358/287 |
| 4,628,534 | 12/1986 | Marshall | 382/41 |
| 4,631,751 | 12/1986 | Anderson et al. | 382/47 |
| 4,633,503 | 12/1986 | Hinman | 382/47 |
| 4,635,078 | 1/1987 | Sakurada et al. | 346/140 R |
| 4,651,287 | 3/1987 | Isao | 364/519 |
| 4,654,721 | 3/1987 | Goertzel et al. | 358/283 |
| 4,656,664 | 4/1987 | Anderson et al. | 382/47 |
| 4,661,987 | 4/1987 | Anderson et al. | 382/41 |
| 4,673,971 | 6/1987 | Ikuta et al. | 358/75 |
| 4,680,645 | 7/1987 | Dispoto et al. | 358/298 |
| 4,686,580 | 8/1987 | Kato et al. | 358/287 |
| 4,700,235 | 10/1987 | Gall | 358/283 |
| 4,733,230 | 3/1988 | Kurihara et al. | 340/728 |
| 4,734,786 | 3/1988 | Minakawa et al. | 358/287 |
| 4,736,254 | 4/1988 | Kotera et al. | 358/283 |
| 4,742,400 | 5/1988 | Tsuji | 358/284 |
| 4,752,822 | 6/1988 | Kawamura | 358/80 |
| 4,771,473 | 9/1988 | Sugiura | 382/47 |
| 4,890,167 | 12/1989 | Nakazato et al. | 358/443 |
| 4,891,714 | 1/1990 | Klees | 358/456 |
| 4,924,322 | 5/1990 | Kijrosawa et al. | 358/448 |
| 4,958,238 | 9/1990 | Katayama et al. | 358/456 |
| 4,969,052 | 11/1990 | Ishida et al. | 358/457 |

*Primary Examiner*—Edward L. Coles, Sr.
*Attorney, Agent, or Firm*—Burns, Doane, Swecker & Mathis

[57] ABSTRACT

A digital halftoning method and apparatus with error diffusion reduces visibly discernible artifacts. In the error diffusion method and apparatus, a range function provides random factors which are used to spread erros to neighboring pixels.

6 Claims, 6 Drawing Sheets

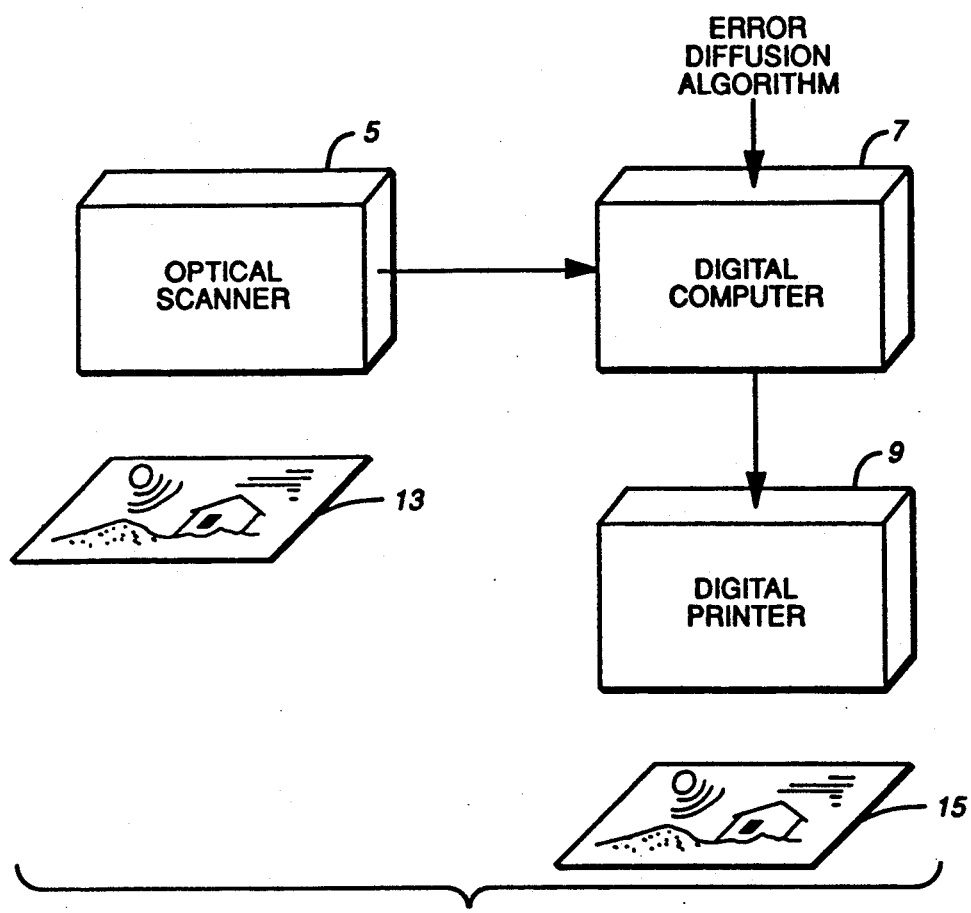
FIG._1
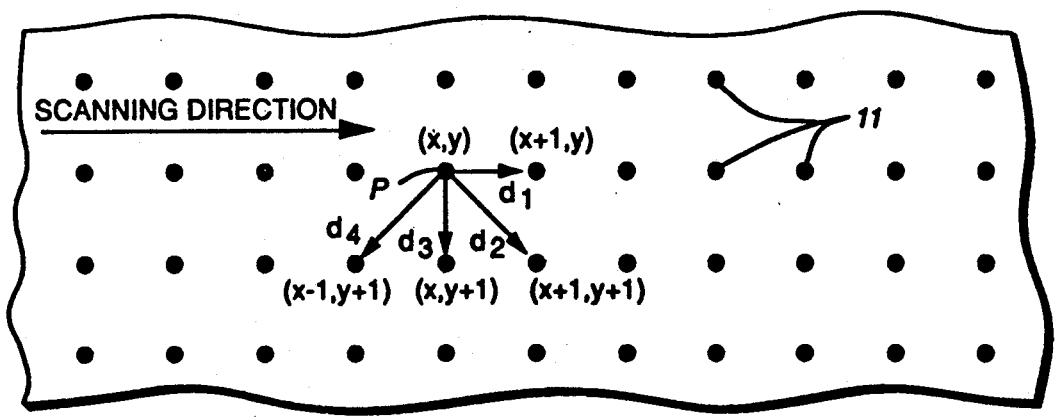
FIG._2

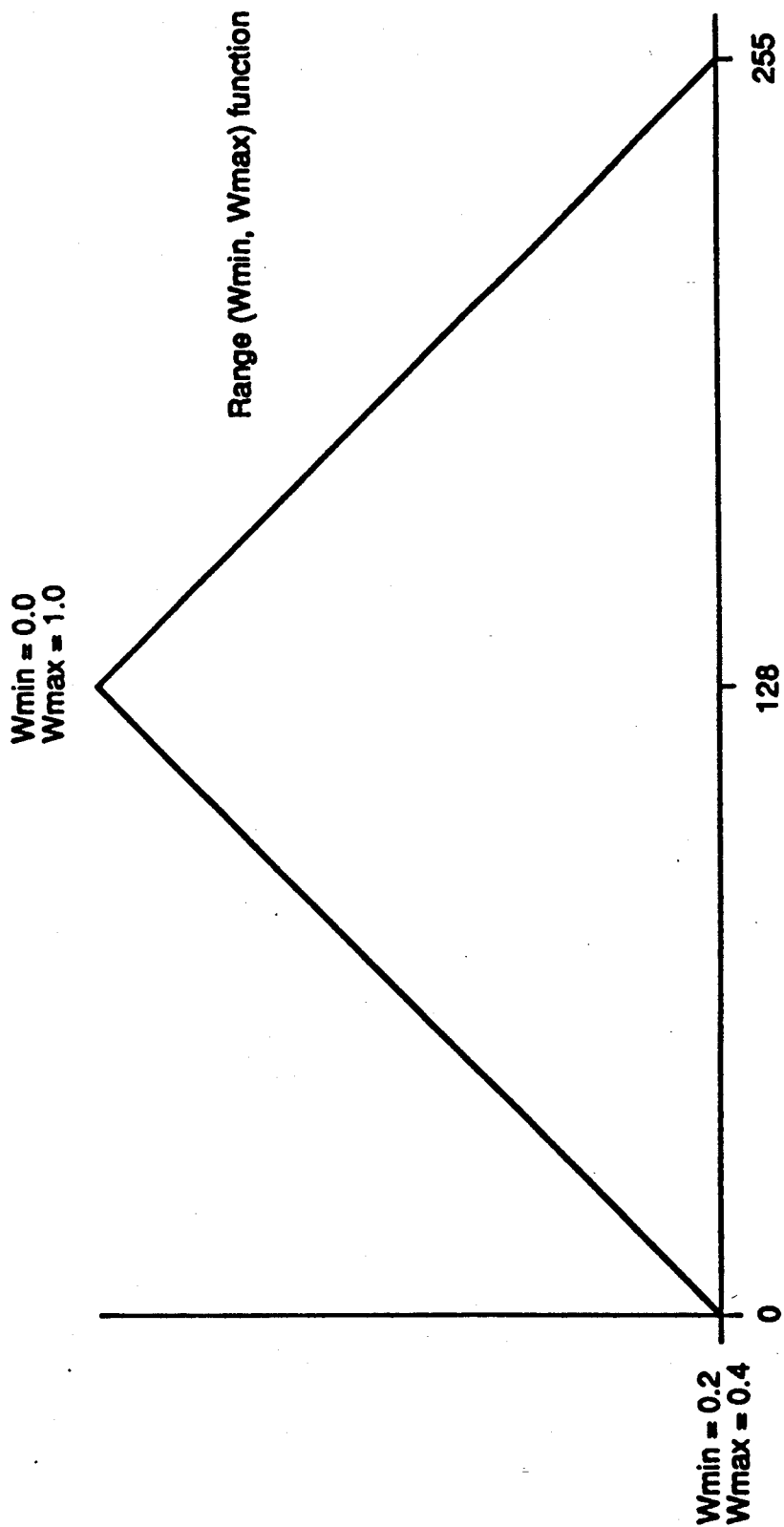

PROCESS FOR PROVIDING DIGITAL HALFTONE IMAGES WITH RANDOM ERROR DIFFUSION

This application is a continuation-in-part of co-pending U.S. patent application Ser. No. 07/257,843 filed Oct. 14, 1988 and U.S. patent application Ser. No. 07/421,931 filed Oct. 16, 1989.

BACKGROUND OF THE INVENTION

The present invention generally relates to a method for producing images by digital halftoning and, more particularly, to a production method based upon digital halftoning with error diffusion.

STATE OF THE ART

In conventional halftone printing, picture elements, or pixels, of a continuous-tone image are converted to dots whose diameters vary in size according to the amplitude of light penetrating a screen. More particularly, the dots are larger where more light penetrates a screen and are smaller where less light is present. Thus, conventional halftone processes can be described as being of the analog type since in the processes, dot size is the analog of color intensity for individual picture elements of an original image.

To produce multi-color images from continuous-tone originals by conventional halftone printing, a color-filtered screen is prepared for each of four primary colors. Then the colors are printed sequentially while maintaining precise mechanical registration of the screens. Although conventional halftone printing can produce excellent results, the processes involve economies-to-scale and are relatively expensive for short production runs.

Digital halftone printing, in contrast to conventional halftone printing, is better suited for shorter production runs. In digital halftone printing, the initial step is to scan an image with an optical scanner that detects light intensity values for selected colors. Then for each pixel location, the detected data are converted to gray-scale values to provide a basis for image production. Typically, gray-scale values range from zero to 255.

More particularly, in digital halftone printing, dots are printed in areas corresponding in scale to the original pixel locations. The printed dots normally are of fixed size, but their placement and density within the printed areas are varied in accordance with the detected gray-scale values. Thus, in images that have been produced by digital halftone printing, dot density within each printed area determines the spatial resolution and perceived grayness of the area to an observer.

One shortcoming of conventional digital halftone printing is that printed images often have a grainy or "noisy" appearance. To reduce the grainy appearance of digital halftone images and to improve detail resolution, it has been suggested to use error diffusion techniques in conjunction with digital halftone printing. For example, the text *Digital Halftoning*, by Robert Ulichney (MIT Press, 1987), pp. 265–268, describes error diffusion techniques with perturbation. Those particular error diffusion techniques are sometimes referred to as spatial dithering.

To apply error diffusion techniques to digital halftone printing, gray-scale values at detected pixel locations are binary coded. Typically, the binary coding threshold is 127, i.e., halfway between the minimum and maximum gray-scale values. The binary number "1", for instance, can be assigned to pixel locations where detected gray-scale values are less than 127, and the binary number "0" can be assigned to pixel locations where detected gray-scale values are 127 or more.

As an example of binary coding for error diffusion in digital halftoning, a pixel location with a detected gray-scale value of 100 would be coded as a binary "1". Similarly, a pixel location with a gray-scale value of 145 would be coded as a binary "0". In monochrome printing systems, a pixel location encoded as a binary "1" generally is black, and a pixel encoded as a binary "0" generally is white.

The above-described coding techniques for digital halftoning with error diffusion inherently result in coding errors for each pixel location having a gray-scale value other than zero or 255. For instance, the magnitude of the coding error resulting from binary encoding a pixel location having a gray-scale value of 100 would be 100 units as measured by gray-scale values. Similarly, the magnitude of the coding error for binary encoding of a pixel location having a gray-scale value of 110 would be 110 units as measured by gray-scale values.

The basic concept underlying digital halftone printing with error diffusion is to distribute, or diffuse, coding errors from the locations at which the errors arise. This concept is further discussed in an article, entitled "An Adaptive Algorithm for Spatial Greyscale", R. W. Floyd and L. Steinberg, Proc. SID, vol. 17/2, pp. 75–77 (1976). Various algorithms have been proposed to accomplish error diffusion.

Although images produced by digital halftone printing with conventional error diffusion techniques may not have a grainy appearance, the printed images often contain discernible patterns. Such patterns are often referred to as "artifacts." Artifacts sometimes appear as straight lines and at other times as wiggly or worm-like shapes. At still other times, artifacts have a random, pebble-like appearance. Regardless of their particular form or shape, however, artifacts detract from the appearance of printed images and therefore limit the commercial usefulness of digital halftoning.

SUMMARY OF THE INVENTION

In accordance with the preferred embodiments, generally speaking, the present invention provides an improved error diffusion process for eliminating visually-perceptible artifacts in images produced by digital halftone imaging. These techniques are as applicable to printing as they are to desk-top publishing, and to any other application that uses a pixel pattern of an image, regardless of the origin of the pixel pattern or the medium where the image is displayed.

In the first preferred embodiment, the present invention provides a process with error diffusion, comprising the steps of:

detecting gray-scale values at preselected pixel locations in an image;

for each detected gray-scale value at the preselected pixel locations, determining upper and lower limits of a range function which depends on the detected gray-scale values, and selecting first and second values which are randomly located between the upper and lower limits of the range function;

if the detected gray-scale value at a preselected pixel location is less than a predetermined threshold value, encoding the pixel location as a binary 1, assigninq a first error value for the preselected pixel location equal to its detected gray-scale value multiplied by the first of the selected randomly located values, assigning a second error value for the preselected pixel location equal to its detected gray-scale value multiplied by the second of the selected randomly located values, and assigning a third error value for the preselected pixel location equal to its detected gray-scale value multiplied by 1 minus the sum of the first of the selected randomly located values and the second of the selected randomly located values;

if the detected gray-scale value at a preselected pixel location is greater than the threshold value, encoding the pixel location as a binary 0, assigning a first error value for the preselected pixel location which equals the first of the selected randomly located values multiplied by a quantity equal to the detected gray-scale value less 255, assigning a second error value for the preselected pixel location which equals the second of the selected randomly located values multiplied by a quantity equal to the detected gray-scale value less 255, and assigning a third error value for the preselected pixel location equal to its detected gray-scale value less 255 multiplied by 1 minus the sum of the first of the selected randomly located values and the second of the selected randomly located values;

then, for each preselected pixel location, distributing the first, second and third assigned error values to three adjacent preselected pixel locations, one of which lies on the same line as the preselected pixel location and the other two of which are on an adjacent line; and printing images based upon values of the preselected pixel locations that have been encoded after distribution of the assigned error values.

More particularly in the first preferred embodiment, the lower limit of the range function is between about zero and 0.2 and varies linearly with the detected gray-scale value of a preselected pixel location. More particularly, the lower limit, $w_{min}$, of the range function preferably is determined by the following equation:

$$w_{min} = \frac{|z - T|}{T} \times 0.2$$

and the upper limit, $w_{max}$, of the range function is determined by the following equation:

$$w_{max} = 1 - \frac{|z - T|}{T} \times 0.6$$

where z is the detected gray-scale value at a preselected pixel location. Alternatively, the upper and lower limits of the range function can be determined from the graph of FIG. 3.

In the second preferred embodiment, the error diffusion process includes the steps of:

scanning an image to detect intensity values at selected pixel locations;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of the intensity scale;

for selected pixel neighbors of the ith pixel in an image, diffusing the calculated error value, $E_i$, of the ith pixel location to its selected neighbors as follows:

$$e_j = (w_j)E_i$$

where $e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location;

continuing the error diffusion process for the other pixel neighbors of the ith pixel location;

continuing the error diffusion process for the (i+1)th pixel location and so forth, such that coding errors are diffused from substantially all of the pixel locations in a scanned image; and printing images by digital halftone printing based upon intensity values of pixel locations that have been modified by error diffusion.

Generally speaking, it is preferred that the predetermined set of neighbor pixels comprises pixels that are immediately adjacent neighbors to a selected ith pixel location. More particularly, it is preferred that the predetermined set of neighbor pixels comprises the pixel that immediately follows a selected ith pixel location, a pixel immediately below the selected ith pixel location, and the pixels that immediately precede and follow the pixel immediately below the selected ith pixel location.

Further in the preferred embodiment, the weights for the jth and subsequent pixel locations are determined as follows:

a) for the first randomly chosen adjacent neighbor pixel, assigning a weight $w_{di}$ which is randomly selected from a distribution of numbers between 0.0 and 1.0;

b) for the second chosen adjacent neighbor pixel, assigning a weight $w_{dj}$ which is randomly selected from a distribution of numbers between 0.0 and $(1.0 - w_{di})$;

c) for the third randomly chosen adjacent neighbor pixel, assigning a weight $w_{dk}$ which is randomly selected from a distribution of numbers between 0.0 and $(1.0 - w_{di} - w_{dj})$; and d) for the last remaining pixel of said set, assigning a weight $w_{dl}$ to it where $$w_{dl} = w_{di} - w_{dj} - w_{dk}.$$

BRIEF DESCRIPTION OF THE DRAWING

The present invention can be further understood by reference to the following description and attached drawing which illustrates the preferred embodiments. In the drawing, FIG. 1 is a functional block diagram of a digital halftoning system which operates according to the process of the present invention;

FIG. 2 schematically shows a field of pixels and is offered as an aid to the description of the error diffusion process of the present invention;

FIG. 3 shows a function for use in the process of the present invention;

DESCRIPTION OF THE PREFERRED EMBODIMENTS

Figure 4:
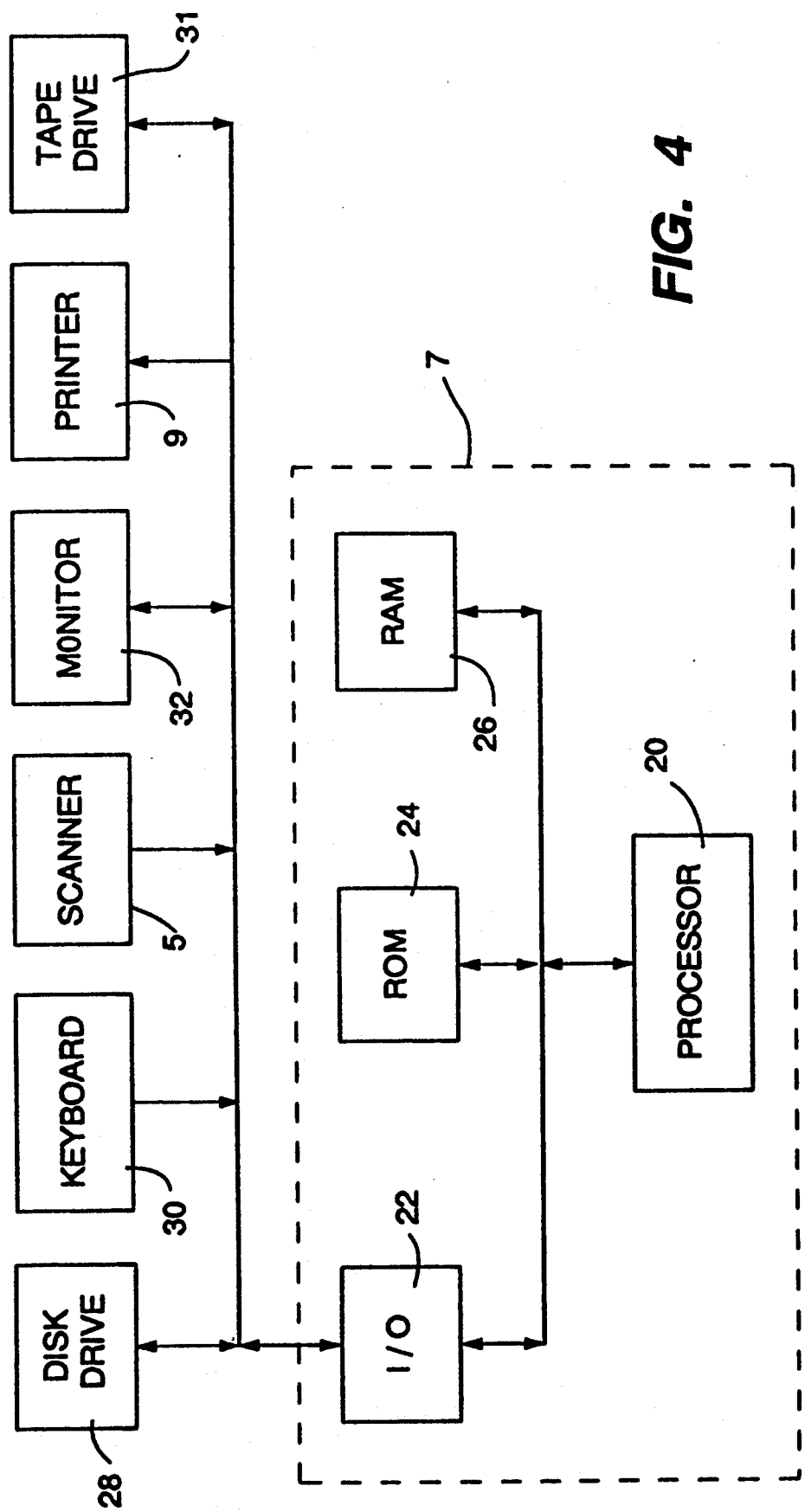
FIG. 4 is a more detailed block diagram of the system of FIG. 1.

FIG. 1 generally shows a system for digital halftone printing. The components of the system comprise an optical image scanner 5, a general purpose digital computer 7, and a digital printer 9. The illustrated components are conventional, but by employing the method of the present invention, the components operate in the system to eliminate the appearance of artifacts in images printed by digital halftoning with error diffusion.

In normal operation of the system of FIG. 1, scanner 5 makes color separations of an image from a medium 13 such as a photographic transparency, a photographic print, or a high-resolution printed original. For each of the separated colors, the picture elements (i.e., pixels) of the original image are digitized to gray-scale values. Then the digitized values are provided to digital computer 7. Within computer 7, the digital information can be processed with conventional graphics software so that images can be retouched, adjusted, recomposed, and so forth. Then the processed images are provided to digital printer 9 for printing onto a sheet 15 by the techniques of conventional digital halftone printing.

When the system of FIG. 1 is operated in accordance with the present invention, the digital image information that is provided to computer 7 is also binary encoded and then is operated upon according to the halftoning process of the present invention to provide error diffusion prior to printing. The object of the error diffusion process of the present invention is to create reproducible images that provide the illusion of a continuous-tone image without discernible artifacts.

An error diffusion process according to the present invention will now be described with reference to FIG. 2. In FIG. 2, each pixel 11 in the field should be understood to represent one pixel location on an image which is presented for optical scanning. For purposes of discussion, it can be assumed that scanning proceeds from left to right across each pixel row and sequentially, row by row, from the top to the bottom of the field. Such a scanning pattern can be described as a raster-type scanning pattern. Other scanning patterns, however, might be used; for example, scanning can proceed from left to right across one row of pixels, then in the opposite direction across the next lower row, and so forth in a serpentine pattern.

The location of each pixel 11 in the field in FIG. 2 can be described by cartesian coordinates; accordingly, an arbitrary pixel "P" is designated as having location (x,y). Because pixel P is in the interior of the field, it has eight immediately-adjacent pixel neighbors. When the pixel field is scanned in a raster-type manner, four of the immediately-adjacent neighboring pixels will be scanned before pixel P, and four will be scanned after pixel P.

In FIG. 2, the pixel to the immediate right of pixel P is designated by arrow d1, the pixel diagonally below pixel P in the scanning direction is designated by arrow $d_2$, the pixel directly below pixel P is designated by arrow $d_3$, and the pixel diagonally below pixel P in the direction opposite the scanning direction is designated by the arrow $d_4$. Thus, the pixel designated by arrow $d_1$ can be described as having cartesian coordinates $(x+1,y)$, and the pixel designated by arrow $d_2$ can be described as having coordinates $(x+1,y+1)$. Likewise, the pixel designated by arrow $d_3$ can be described as having coordinates $(x,y+1)$, and, finally, the pixel designated by arrow $d_4$ can be described as having coordinates $(x-1,y+1)$. The set of directions $d_1$ through $d_3$ and $d_1$ through $d_4$ are herein called the "direction sets" with $d_1$ through $d_3$ for the first embodiment and $d_1$ through $d_4$ for the second embodiment.

FIG. 4 is an expanded block diagram over the block diagram shown in FIG. 1. FIG. 4 shows several additional input/output devices which might be used for the various possible applications of the present invention including image production, printing, desk-top publishing and CRT (cathode ray tube) display, to name just a few. In addition to optical scanner 5 and printer 9 (which are both shown here and in FIG. 1), there is a magnetic or optical disk drive 28, a keyboard 30, a monitor 32 and a tape drive 31. Also, FIG. 4 shows internal details of digital computer 7, namely, a processor 20 which communicates via a data bus with RAM 26, ROM 24 and input/output interface 22. Input/output interface 22, in turn, then might communicate with disk drive 28, keyboard 30, scanner 5, monitor 32, tape drive 31, and printer 9 via a secondary data bus that is external to computer 7.

By including the additional input/output devices the data, or image, that is to be enhanced by the present invention can be other than a photographic image which is input into the system by first scanning a photograph, as discussed above. For example, the image to be processed may be a computer-generated image that is being displayed on monitor 32 where the processed image may either be displayed on monitor 32, printed on printer 9, or it may be represented by a previously stored pixel pattern which is stored magnetically or optically on a disk. There are many options which are discussed further elsewhere herein.

For purposes of discussion, the error diffusion process of both embodiments of the present invention will be described as beginning at pixel P in FIG. 2. Further for purposes of discussion, the magnitude of the detected gray-scale value of pixel P will be described as an arbitrary number "z" which is between zero and 255, inclusive. Still further, the coding error for any pixel location in the field will be referred to as $E_{x,y}$ where the subscripts identify the cartesian coordinates of the pixel.

When a pixel at a given location (x,y) has a value z that lies between a threshold value T and the maximum gray-scale value (e.g., 255), the magnitude of the encoding error $E_{x,y}$ will be a negative number equal to z minus 255 gray-scale units; that is, $$E_{x,y} = z - 255 \text{ for } z \geq T.$$

When the pixel value z is a number between zero and the threshold value, the magnitude of the encoding error is simply equal to the value z in gray-scale units; that is, $$E_{x,y} = z \text{ for } z < T.$$

The selected threshold value T is usually a number about midway along the selected gray-scale and typically equals 128. Although the threshold value usually is held constant, it could be randomly varied, or dithered, in a relatively narrow range about a chosen central value (e.g., 128). In that case, further randomness would be introduced into the error diffusion process that will be described below.

First Embodiment

In the first embodiment of the present invention, the gray-scale values z of pixels are used as the arguments of range functions. One example of range functions, $w_{min}$ and $w_{max}$, is shown in FIG. 3. In this example, the range functions provide variable minimum and maximum limits which are linearly dependent upon the detected gray-scale values z of pixels. For pixel values ranging between zero and 128, the smallest minimum value of the range function $w_{min}$ is zero, and the largest minimum value is 0.2. Also, for pixel values z between 128 and 255, the smallest minimum value of the range function $w_{min}$ is zero, and the largest minimum value is 0.2. Algebraically, the range function $w_{min}$ can be approximated as follows:

$$w_{min} = \frac{|z - T|}{T} \times 0.2$$

Further in FIG. 3, for pixel values z between zero and 128, the smallest maximum value of the range function $w_{max}$ is 0.4, and the largest maximum value is 1.0. For pixel values between 128 and 255, the smallest maximum value of the range function $w_{max}$ is 0.4, and the largest maximum value is 1.0. Algebraically, the range function $w_{max}$ can be approximated as follows:

$$w_{max} = 1 - \frac{|z - T|}{T} \times 0.6$$

According to the present invention, the range functions $w_{min}$ and $w_{max}$ are employed to calculate pseudo-random weights $r_1$, $r_2$ and $r_3$. For calculation of pseudo-random weight $r_1$, a random number is selected, then the random number is multiplied by the numerical range between $w_{min}$ and $w_{max}$, and the resultant product is added to $w_{min}$. In practice, the random selection process does not employ a random number generator but, to minimize processing time, uses a look-up table of uniformly distributed random numbers expressed as decimals. An identical procedure is followed to calculate weight $r_3$. Then the sum of the pseudo-random weights $r_1$ and $r_3$ is subtracted from the unity to yield a third pseudo-random weight $r_2$; that is, $r_2 = 1.0 - r_1 - r_3$.

The pseudo-random weights $r_1$, $r_2$ and $r_3$ are used to propagate, or spread, error values to the pixels at locations (x+1,y), (x+1,y+1) and (x,y+1), respectively. More particularly, the error propagated to the pixel located at (x+1,y) from the pixel located at (x,y) is determined by multiplying the weight $r_1$ by the encoding error for pixel P; that is, $err_1 = r_1 * E_{x,y}$. Likewise, the error propagated to the pixel located at (x,y+1) is $err_2 = r_2 * E_{x,y}$. Finally, the error propagated to the pixel located at (x+1,y+1) is $err_3 = r_3 * E_{x,y}$. Thus, the propagated errors $err_1$, $err_2$, $err_3$ can be understood to be pseudo-randomized error values which are diffused or distributed to pixels neighboring pixel P in the direction of the arrows $d_1$, $d_2$, and $d_3$, respectively, of FIG. 2.

It should be noted that the propagated errors can be either positive or negative. Also, it should be understood that pixels with detected gray-scale values of either zero or 255 do not generate error values. That is, error values are not diffused from pixels having gray-scale values of zero and 255, but error values can be diffused to such pixels.

For binary encoding purposes, the gray-scale value of the pixel located at (x+1,y) becomes the detected gray-scale value for that pixel location plus the propagated error $err_1$. Likewise, the gray-scale value of the pixel located at (x+1,y+1) becomes the detected gray-scale value for that pixel plus the propagated error $err_2$. Finally, the gray-scale value of the pixel located at (x,y+1) becomes the detected gray-scale value at that pixel plus the propagated error $err_3$.

It should be understood that the above-described error diffusion process continues with successively scanned pixels. Thus, the binary encoding error for the pixel located at (x+1,y) will reflect the propagated error $err_1$ as well as the errors propagated from other previously scanned pixel locations. In turn, the error value for pixel location (x+1,y) is weighted by the pseudo-random process and then diffused to the pixels located at (x+2,y), (x+1,y+1), and (x+2,y+1). The process continues for each pixel in a row and then begins again at the first pixel on the next lower row.

In practice, special error assignment rules must be provided for the first and the last pixel locations in a row. For the last pixel location scanned in a row, a convenient rule is that an encoding error is assigned only to the pixel located immediately below. For the first pixel scanned in a row, a convenient rule is that its assigned error value reflects only the error assigned from the pixel immediately above.

The above-described error diffusion process can be summarized as follows. First, in accordance with the range distribution function of FIG. 3, the range of $w_{min}, w_{max}$ is determined by the gray-scale value of the pixel located at (x,y). Then, the following calculations are made:

1. $r_1 = $ RANDOM $[w_{min}(\text{pixel}(x,y)), w_{max}(\text{pixel}_{(x,y)})]$
2. $r_3 = $ RANDOM $[w_{min}(\text{pixel}(x,y)), w_{max}(\text{pixel}_{(x,y)})]$
3. $r_2 = 1.0 - r_1 - r_3$
4. For each input pixel location (x,y), if the detected gray-scale value of the pixel at that location is less than the preselected threshold value, then
    pixel$_{(x,y)}$ is black, and
    error = value of pixel$_{(x,y)}$
   or else,
    pixel$_{(x,y)}$ is white, and
    error = pixel$_{(x,y)} - 255$.
5. Then the distributed error values are calculated as follows:
    $err_1 = r_1 * E_{x,y}$,
    $err_2 = r_2 * E_{x,y}$, and
    $err_3 = r_3 * E_{x,y}$.
6. Then the error values are distributed to neighboring pixel locations as follows:
    pixel$_{(x+1,y)}$ = pixel$_{(x+1,y)}$ + $err_1$
    pixel$_{(x+1,y+1)}$ = pixel$_{(x+1,y+1)}$ + $err_2$
    pixel$_{(x,y+1)}$ = pixel$_{(x,y+1)}$ + $err_3$.

Figure 5:
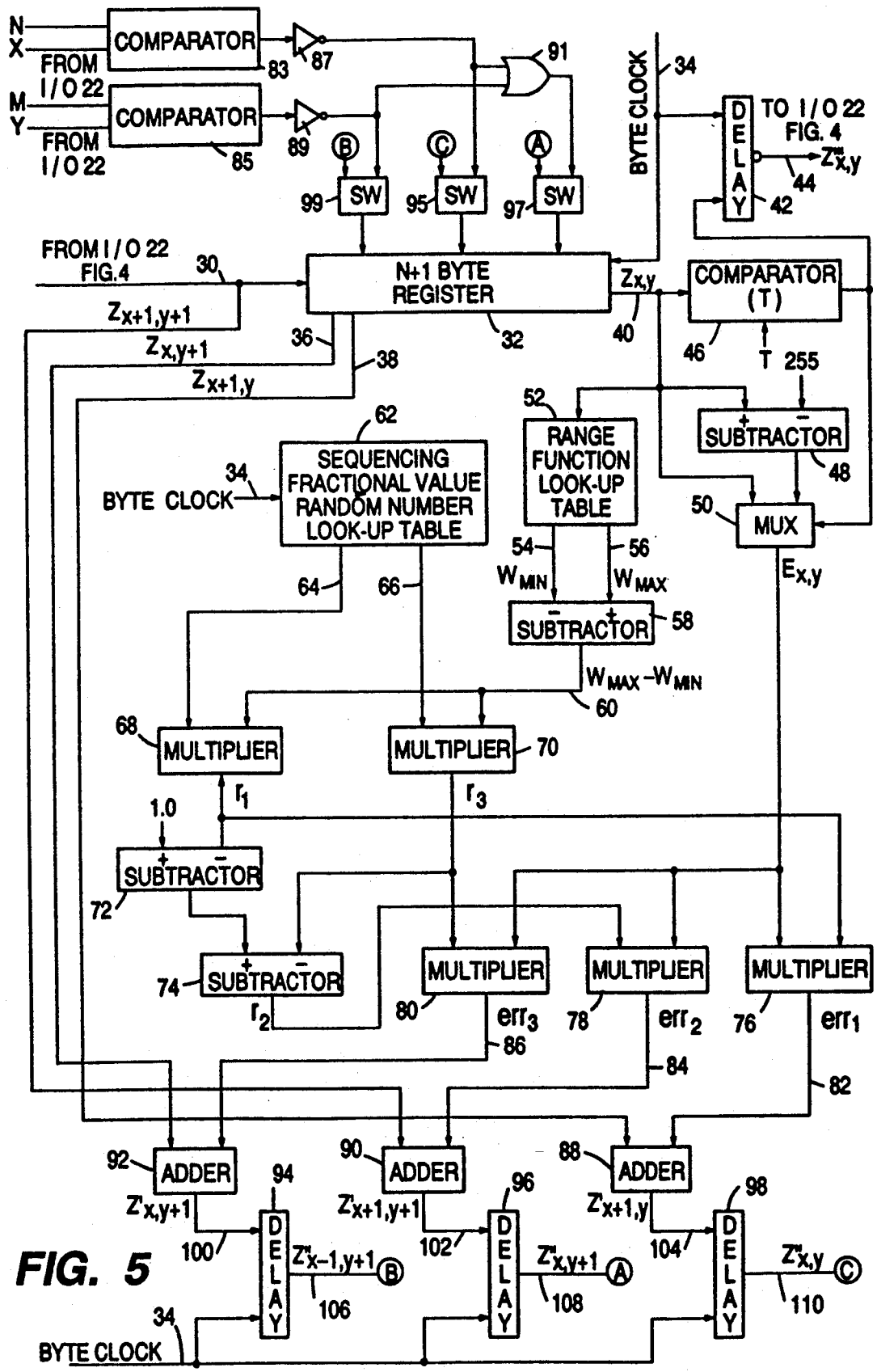
FIG. 5 is a discrete block diagram implementation of the first embodiment of the present invention.

FIG. 5 shows a block diagram implementation of computer 7 for the first embodiment error diffusion technique of the present invention. This implementation is for a pixel pattern that is scanned, displayed or stored, as shown in FIG. 2, with each of the registers initially set to zero, N pixels to a row, and M pixel rows. The z gray-scale values for each pixel are sequentially applied to an N+1 byte-long register 32 from I/O interface 22 that contain the z values for pixels P$_{(x,y)}$ through P$_{(x,y+1)}$ with the z value for P$_{(x+1,y+1)}$ being the next data to be received by register 32. From register 32 the z values of each of the four pixels needed for the operation of the first embodiment of the present invention are available.

There are two paths in this operation which come together at the end for the final calculations. First, there is the path for calculating the error associated with the operational pixel, $P_{x,y}$. Also, $z_{x,y}$ is applied to comparator 46, the positive terminal of subtractor 48, and multiplexer 50. In subtractor 48 the value 255 is subtracted from $z_{x,y}$, and the resulting value from subtractor 48 is applied to a second input terminal of multiplexer 50. The output signal from comparator 46 is used to select between the two input signals to multiplexer 50. In comparator 46, $z_{x,y}$ is compared to the threshold value, T. If $z_{x,y}$ is less than T, then $z_{x,y}$ is selected as the output signal from multiplexer 50, and if $z_{x,y}$ is greater than or equal to T, then the output signal from subtractor 48 is the output signal from multiplexer 50. The signal from multiplexer 50 is $E_{x,y}$, as discussed above. The output signal from comparator 46, $z'_{x,y}$, also represents the gray-scale value of the pixel at x,y that is to be printed, displayed or stored by the present invention. Since the output signal from comparator 46 is a one-bit binary signal, its value is either 0 (pixel off) or 1 (pixel on). In printing, a "pixel off" results in no color being applied to the medium at that location, and thus a white pixel remains (or whatever the color of the material on which the printing is being performed), whereas on a monitor a "pixel off" results in a black pixel at that location. For a "pixel on" signal the result is just the opposite.

The second path of this embodiment begins with the value of $z_{x,y}$ as the address pointer to range function look-up table 52 where 256 values of $w_{min}$ and $w_{max}$ are stored, one value of each for each potential value of $z_{x,y}$. This could also be implemented by a combination of subtractor, divider and multiplier to individually calculate the values for $w_{min}$ and $w_{max}$. The $w_{min}$ is next subtracted from $w_{max}$ by subtractor 58 with the result of that calculation being applied to one input terminals of each of multipliers 68 and 70. The other input terminals of each of multipliers 68 and 70 receive a random fractional value from look-up table 62. The output signals from multipliers 68 and 70 represent the values $r_1$ and $r_3$, respectively. The value of $r_1$ is then subtracted from 1.0 by subtractor 72, and the value of $r_3$ is then subtracted from the resultant value from subtractor 72 by subtractor 74 to form the value of $r_2$.

The two initial paths of this embodiment now come together at multipliers 76 through 80 where the value $E_{x,y}$ is multiplied by each of the values of $r_1$, $r_2$ and $r_3$, respectively, to form the values $err_1$, $err_2$ and $err_3$. The next step is to error correct the three later presented pixel values to which vectors $d_1$, $d_2$ and $d_3$ point in FIG. 2. This is done by adders 88 through 92 where the values of $err_1$ through $err_3$ are added to $z_{(x+1,y)}$, $z_{(x+1,y+1)}$, and $z_{(x,y+1)}$, respectively, to form the new values of those pixels as influenced by the coding error associated with pixel $P_{x,y}$. Keep in mind that each pixel is influenced by the error at up to three other pixels in this embodiment of the present invention. Finally, these new values of those pixels are applied to delays 94 through 98 with the output signals from the delays being applied to register 32 to substitute the new values for the previous values contained in register 32 which are shown on the associated output lines as z'. The labels on the output lines from delays 106 through 110 are $z''_{(x-1,y+1)}$, $z''_{(x,y+1)}$ and $z''_{(x,y)}$ which correspond to their locations after the occurrence of the next byte clock signal.

The final piece of housekeeping is to repeat the above for each pixel in the image in response to the byte clock signal, and when x equals N or y equals M, to block the changes to the pixel values in register 32 from delays 96 and 98 (x=N) and delays 94 and 96 (y=M), respectively. The blocking discussed above is necessary to prevent the value of the pixels in the last column from effecting the pixels in the first column (x=N), and from trying to change the values of pixels in a non-existent M+1 row. To block changes to the gray-scale values of the later occurring pixels where there are no later occurring pixels in the row (x>N) and where there is no additional row (y>M), the signals from delays 106 through 110 have to be switched to register 32 by comparators 83 and 85. From I/O interface 22 the values of N and x, and M and y are applied to comparators 83 and 85, respectively. The output signal from each of comparators 83 and 85 are then inverted by inverters 87 and 88, respectively. The output signal from delay 96 must be blocked if either of the output signals from comparators 83 and 85 is high, and the output signals from delays 98 and 94 must be blocked if the output signal from comparators 83 and 85 is individually high, respectively. Switches 95 through 99 under the control of comparators 83 and 85 perform the necessary blocking when the corresponding condition is met by opening the switch. At all other times the switches are closed. Since switch 97 must be controlled by both comparators 83 and 85, the output signals from inverters 87 and 89 are applied to the input terminals of a two-input OR gate 91 to generate the combined control signal for switch 97.

Second Embodiment

In the second embodiment of the present invention of an error diffusion process, coding errors are randomly diffused from each given pixel location to four immediately-adjacent neighboring pixel locations that are scanned after the given pixel location. More particularly, for each pixel location from which a coding error is diffused, a random choice is made of the order in which errors are to be diffused to the immediately-adjacent neighbors of the pixel location under consideration; that is, the order of directions within the direction set are randomly selected. For purposes of the following discussion, the directions from pixel P to the four immediately-adjacent pixel neighbors that are scanned after pixel P are designated as directions $d_i$, $d_j$, $d_k$, and $d_l$ to emphasize that the directions are randomly assigned. To provide random assignments within the direction set, it is usually convenient to use a sequencing look-up table containing approximately several thousand random numbers.

Further in the second embodiment of an error diffusion process according to the present invention, after direction assignments are randomly determined within a direction set, a first direction $d_i$ is assigned a weighting factor $w_{di}$ where the value of the weighting factor is randomly chosen from a uniform distribution of weights between 0.0 and 1.0. Next, a second randomly chosen direction $d_j$ is assigned a weighting factor $w_{dj}$ where the value of the weighting factor is randomly chosen from a uniform distribution of weights between 0.0 and $(1.0-w_{di})$. Next, the third randomly selected direction $d_k$ is assigned a weighting factor $w_{dk}$ where the value of the weighting factor is randomly chosen from a uniform distribution of weights between 0.0 and $(1.0-w_{di}-w_{dj})$. Finally, the remaining direction $d_l$ is assigned a weighting factor $w_{dl}$ such that $w_{dl}=1-w_{di}-w_{dj}-w_{dk}$. Thus, it may be noted that:

$$w_{di} + w_{dj} + w_{dk} + w_{dl} = 1.$$

As mentioned above, pseudo-random weights $w_{di}$, $w_{dj}$, $w_{dk}$, and $w_{dl}$ are used to propagate, or spread, coding errors to the four immediately-adjacent neighbors of each scanned pixel location. For convenience of expression, the propagated error values are designated herein as $e_1$, $e_2$, $e_3$, and $e_4$ to designate the error values which are distributed to pixel locations $(x+1,y)$, $(x+1,y+1)$, $(x,y+1)$, and $(x-1,y+1)$, respectively. Also, for convenience it can be assumed that weighting factor $w_{di}$ is associated with error $e_1$, that weighting factor $w_{dj}$ is associated with error $e_2$, that weighting factor $w_{dk}$ is associated with error $e_3$, and that weighting factor $w_{dl}$ is associated with error $e_4$.

According to the foregoing, the error value $e_1$ which is to be propagated to the pixel located at $(x+1,y)$ from the pixel located at $(x,y)$ is determined by multiplying the weighting factor $w_{di}$ by the encoding error for pixel P; that is, $e_1 = (w_{di})(E_{x,y})$. Likewise, the error $e_2$ propagated to the pixel located at $(x,y+1)$ is $e_2 = (w_{dj})(E_{x,y})$, and the error $e_3$ propagated to the pixel located at $(x+1,y+1)$ is $e_3 = (w_{dk})(E_{x,y})$. Finally, the error $e_4$ propagated from pixel P to the pixel located at $(x-1,y+1)$ is $e_4 = (w_{dl})(E_{x,y})$ Collectively, the error values $e_1$, $e_2$, $e_3$, and $e_4$ can be understood to be pseudo-randomized error values. It should be noted that those propagated error values can be either positive or negative.

As a result of a coding error being diffused, gray-scale values of neighboring pixels are increased, or decreased. For example, after error diffusion from pixel P at location $(x,y)$, the gray-scale value imputed to the location $(x+1,y)$ would be the detected gray-scale value for that location plus the propagated error $e_1$. Likewise, the gray-scale value imputed to the pixel located at $(x+1,y+1)$ would be the detected gray-scale value for that pixel location plus the propagated error $e_2$. The effects of the error diffusion process on the pixel neighbors of pixel P in this example can be summarized as follows:

$$\text{pixel}'_{(x+1,y)} = \text{pixel}_{(x+1,y)} + e_1$$

$$\text{pixel}'_{(x+1,y+1)} = \text{pixel}_{(x+1,y+1)} + e_2$$

$$\text{pixel}'_{(x,y+1)} = \text{pixel}_{(x,y+1)} + e_3 \text{ and}$$

$$\text{pixel}'_{(x-1,y+1)} = \text{pixel}_{(x-1,y+1)} + e_4$$

where the primes indicate that the gray-scale values of the pixel locations are updated as a result of the above-described error diffusion process.

It should be emphasized that the above-described error diffusion process continues for each successively scanned pixel location. For example, as a result of the error diffusion process, the gray-scale value for the pixel located at $(x+4,y+5)$ will reflect the error propagated from its neighboring pixels located at $(x+3,y+4)$, $(x+4,y+4)$, $(x+5,y+4)$, and $(x+3,y+4)$. Also, the binary coding error propagated from the pixel location $(x+4,y+5)$ will reflect the errors propagated to that location from its set of neighboring pixels, and that error, in turn, will be weighted by the above-described pseudo-random process and then will be diffused to the pixels located at $(x+5,y+5)$, $(x+5,y+6)$, $(x+4,y+6)$, and $(x+3,y+6)$.

For multi-color halftone printing, a field such as that shown in FIG. 2 can be sequentially scanned with different color filters or, alternatively, can be scanned once with each picture element having multiple exposures with different filters. Then for each of the selected colors and each of the pixel locations in the scanned field, binary coding errors are diffused as described above. Multi-color images without discernible artifacts can then be printed by conventional digital halftone printing procedures.

For either monochrome or multi-color halftone printing, the above-described process can be summarized by the following algorithm:

1) for selected pixel neighbors of the ith pixel location, diffuse the error value $E_i$ of the ith pixel as follows:

$$e_j = (w_j) E_i$$

where $e_j$ is the error value diffused to the jth pixel location from the ith pixel location, where the jth pixel location is randomly determined from the predetermined set of pixels neighboring the ith pixel location, and where $w_j$ is the weighting factor determined for the jth pixel location according to the procedures described above;

2) continue the error diffusion process for the other pixel neighbors of the ith pixel location; and 3) continue the error diffusion process for the $(i+1)$th pixel location, and so forth.

Figure 6:
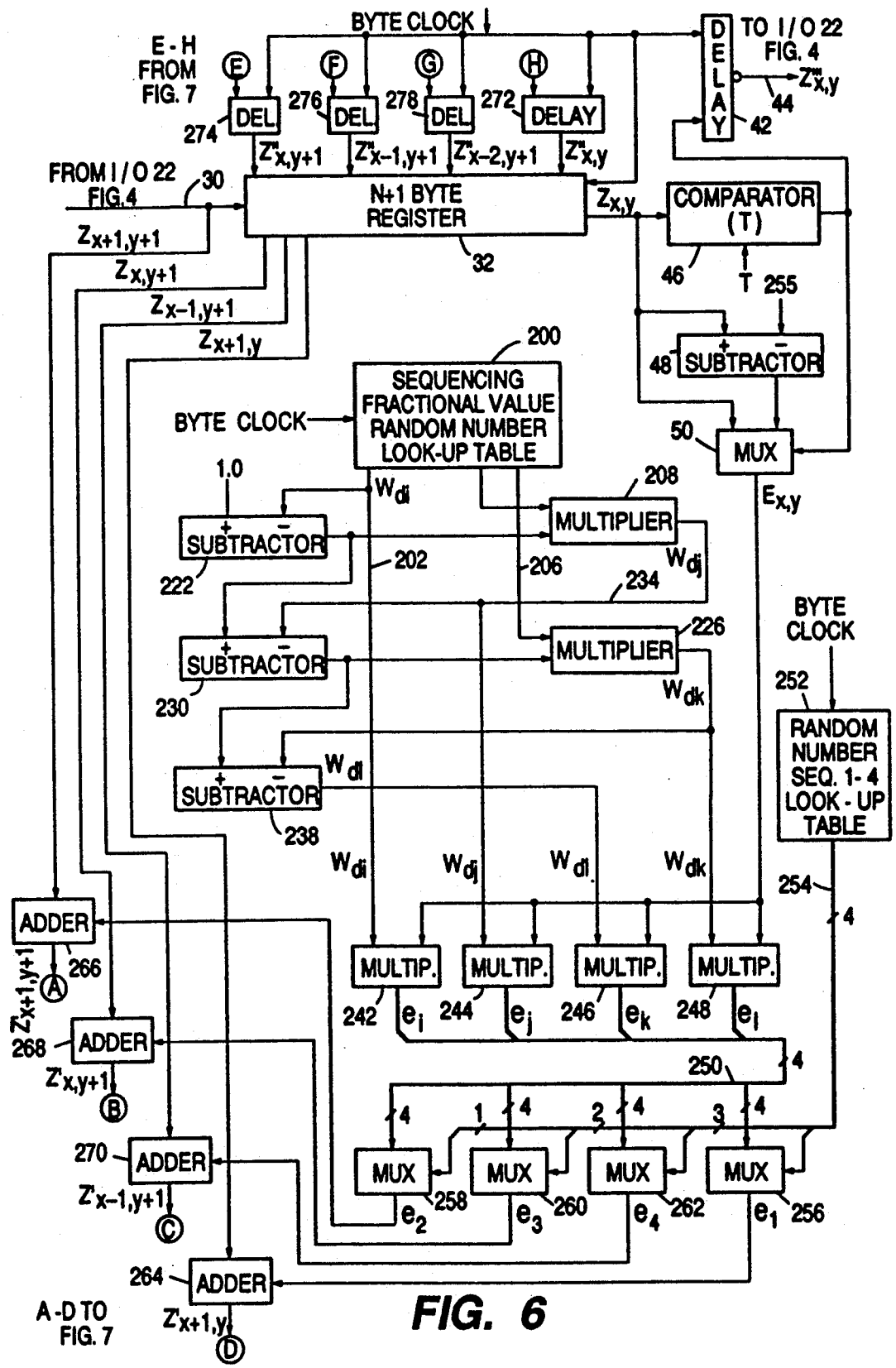
FIG. 6 is a discrete block diagram implementation of the second embodiment of the present invention.

FIG. 6 shows a block diagram implementation of computer 7 for the second embodiment error diffusion technique of the present invention. This implementation is for a pixel pattern as shown in FIG. 2 with each of the registers initially set to zero, N pixels to a row, and M pixel rows. The z gray-scale values for each pixel are sequentially applied to an $N+1$ byte-long register 32 from I/O interface 22 that contain the z values for pixels $P_{(x,y)}$ through $P_{(x,y+1)}$ with the z value for $P_{(x+1,y+1)}$ being the next data to be received by register 32. From register 32 the z values of each of the five pixels needed for the operation of the second embodiment of the present invention are available.

There are two paths in this operation which come together at the end for the final calculations. First, there is the path for calculating the error associated with the operational pixel, $P_{x,y}$. Also, $z_{x,y}$ is applied to comparator 46, the positive terminal of subtractor 48, and multiplexer 50. In subtractor 48 the value 255 is subtracted from $z_{x,y}$ and the resulting value from subtractor 48 is applied to a second input terminal of multiplexer 50. The output signal from comparator 46 is used to select between the two input signals to multiplexer 50. In comparator 46, $z_{x,y}$ is compared to the threshold value, T. If $z_{x,y}$ is less than T, then $z_{x,y}$ is selected as the output signal from multiplexer 50, and if $z_{x,y}$ is greater than or equal to T, then the output signal from subtractor 48 is the output signal from multiplexer 50. The signal from multiplexer 50 is $E_{x,y}$, as discussed above. The output signal from comparator 46, $z'''_{x,y}$, also represents the gray-scale value of the pixel at x,y that is to be printed, displayed or stored by the present invention.

The second path of this embodiment begins with the presentation of three random numbers, each having a fractional value from look-up table 200. One of these random numbers is arbitrarily selected for weighting factor $w_{di}$. That value is then applied to subtractor 222 where it is subtracted from 1.0 and the result applied to multiplier 208. A second of the random number from look-up table 200 is also applied to multiplier 208 to generate the second weighting factor $w_{dj}$. Weighting factor $w_{dj}$ is then subtracted from the resultant value from subtractor 222 by subtractor 230. The resultant value from subtractor 230 is then multiplied by the third random number from look-up table 200 to generate weighting factor $w_{dk}$. Next, weighting factor $w_{dk}$ is subtracted from the resultant value from subtractor 230 by subtractor 238 to form weighting factor $w_{dl}$.

At this point the two paths merge with the individual multiplication of each of the weighting factors by the error signal $E_{x,y}$ in multipliers 242 through 248 with the resultant values being error values $e_i$, $e_j$, $e_k$ and $e_l$. The next step is to randomly collate these error values with each of the pixels to which vectors $d_1$ through $d_4$ are pointing in FIG. 2. To do that, four multiplexers 256 through 262 have been included with each of $e_i$ through $e_l$ being applied as the four input signals to each of multiplexers 256 through 262. The selection from the input signals is performed under the control of look-up table 252 which contains, in random order, all of the possible combinations of the four numbers 1 through 4. Thus, the errors values are provided by multipliers 256 through 262 as $e_1$ through $e_4$, respectively. The next step is to error correct the four later pixel values to which vectors $d_1$, $d_2$, $d_3$ and $d_4$ point in FIG. 2. This is done by adders 264 through 270 where the values of $e_1$ through $e_4$ are added to $z_{(x+1,y)}$, $z_{(x+1,y+1)}$, $z_{(x,y+1)}$ and $z_{(x-1,y+1)}$, respectively, to form the new values of those pixels as influenced by the coding error at $P_{x,y}$. Keep in mind that each pixel is influenced by the coding error at up to four other pixels in this embodiment of the present invention. Finally, these new values of those pixels are applied to delays 272 through 278 with the output signals from the delays being applied to register 32 to substitute the new values for the previous values contained in register 32.

The final piece of housekeeping is to repeat the above for each pixel in the image in response to the byte clock signal, and when x equals 0 or N or y equals M, to block the changes to the pixel values in register 32 from delay 278 (x=0), delays 272 and 274 (x=N) and delays 274-278 (y=M), respectively. The blocking discussed above is necessary to prevent the value of the pixels in the first column from effecting the pixels in the last column (x=0), the pixels in the last column from effecting the pixels in the first column (x=N), and from trying to change the values of pixels in a non-existent M+1 row. To block changes to the gray-scale values of the later occurring pixels where there are no earlier occurring pixels in the row (x<1), where there are no later occurring pixels in the row (x>N) and where there is no additional row (y>M), the signals from delays 272 through 278 have to be switched to register 32.

Figure 7:
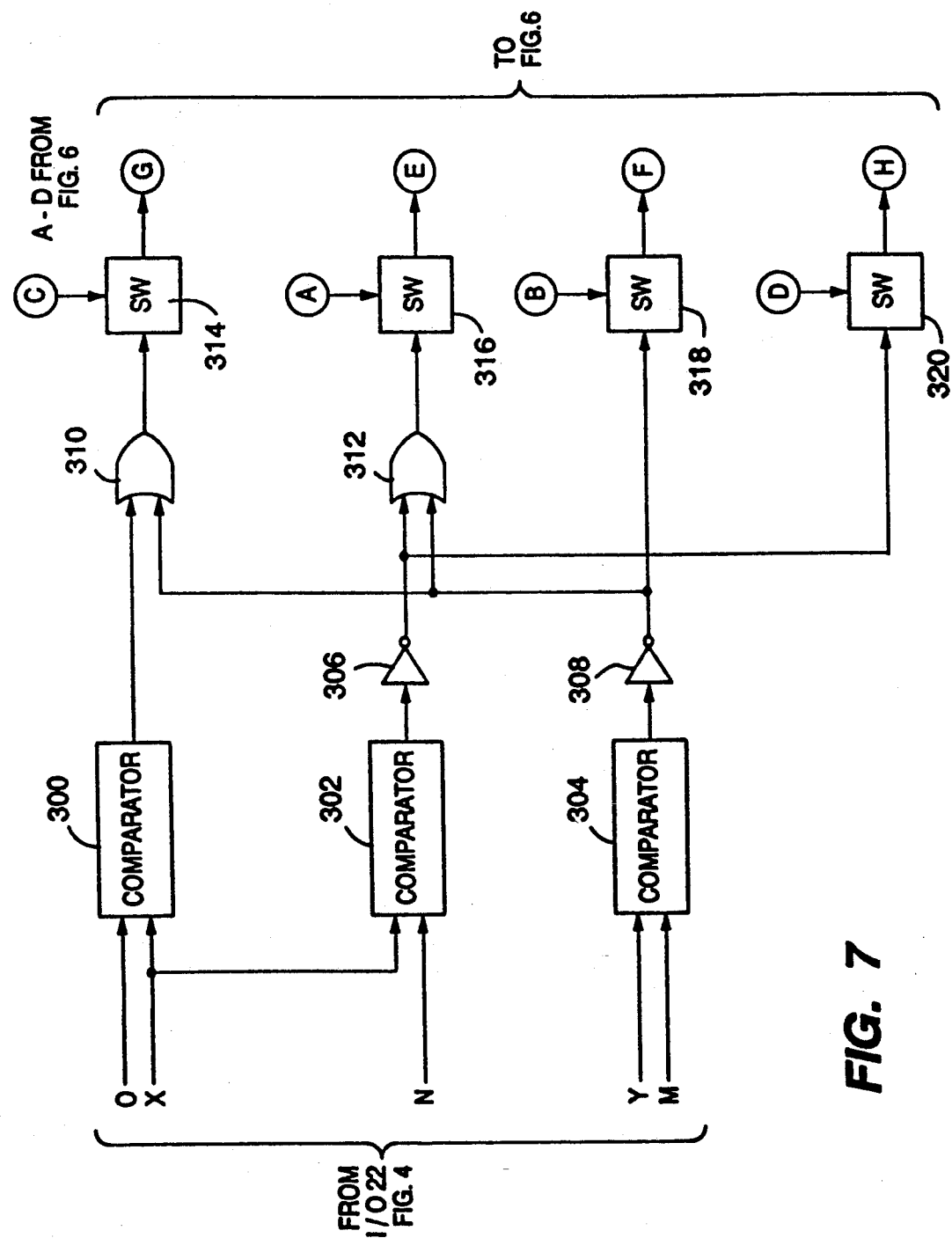
FIG. 7 is a block diagram of the blocking circuit for FIG. 6 to account for edge conditions.

The circuitry for performing this function is shown in FIG. 7. The values of x, y, N and M are obtained form I/O interface 22 in FIG. 4, and signals A through D are obtained from FIG. 6. Comparators 300 through 304 determine whether x=0, x=N and y=M, respectively. The output signals from each of comparators 302 and 304 are then inverted by inverters 306 and 308, respectively. The signals from inverters 306 and 308 individually control the switching of switches 320 and 318, respectively, to block B and D when the appropriate condition is met. Signals A and C need to be blocked when either of two conditions are met; these switches 314 and 316 are individually controlled by the output signal from AND gate 312 and 310, respectively. OR gate 310 allows control of switch 314 by either comparator 300 or 304, and OR gate 312 allows control of switch 316 by either comparator 302 or 304.

In conclusion, although the preferred embodiments of the present invention have been described, those skilled in the art will appreciate that additions, modifications, substitutions and deletions not specifically described in the foregoing may be made to the preferred embodiment of the process. For example, diffusion directions can be chosen other than the above-discussed set of four directions. Moreover, it is not necessary for the present invention that errors be diffused to only immediately-adjacent pixel neighbors.

Accordingly, the above-described embodiments should be regarded as illustrative rather than restrictive, and it should be appreciated that workers skilled in the art may make variations in those embodiments without departing from the spirit or scope of the present invention as defined by the following claims.

What is claimed is:

1. An image enhancement process with error diffusion, comprising the steps of:

detecting gray-scale values at preselected pixel locations in an image;

for each detected gray-scale value at the preselected pixel locations, determining upper and lower limits of a range function which depends on the detected gray-scale values, and selecting first and second values which are randomly located between the upper and lower limits of the range function, and assigning a third error value for the preselected location equal to its detected gray-scale value multiplied by 1 minus the sum of the first of the selected randomly located values and the second of the selected randomly located values;

if the detected gray-scale value at a preselected pixel location is less than a predetermined threshold value, encoding the pixel location as a binary zero, assigning a first error value for the preselected pixel location equal to its detected gray-scale value multiplied by the first of the selected randomly located values and assigning a second error value for the preselected pixel location equal to its detected gray-scale value multiplied by the second of the selected randomly located values;

if the detected gray-scale value at a preselected pixel location is greater than the threshold value, encoding the pixel location as a binary one, assigning a first error value for the preselected pixel location which equals the first of the selected randomly located values multiplied by a quantity equal to the detected gray-scale value less 255, and assigning a second error value for the preselected pixel location which equals the second of the selected randomly located values multiplied by a quantity equal to the detected gray-scale value less 255 and assigning a third error value for the preselected pixel locations equal to its detected gray-scale value less 255 multiplied by 1 minus the sum of the first of the selected randomly located values and the second of the selected randomly located values;

then, for each preselected pixel location, distributing the first and second assigned error values to at least three adjacent preselected pixel locations, one of which lies on the same line as the preselected pixel location and the other two of which are on an adjacent line; and retaining images for display on a selected medium based upon values of the preselected pixel locations that have been encoded after distribution of the assigned error values.

2. A digital halftoning process with random error diffusion for reducing visually apparent artifacts in images that are produced by digital halftone image enhancement, comprising the steps of:

detecting intensity values at selected pixel locations in an image;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of the intensity scale;

for selected pixel neighbors of the ith pixel in an image, diffusing the calculated error value, $E_i$, of the ith pixel location to its selected neighbors as follows:

$$e_j = (w_j) E_i$$

where $e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location;

continuing the error diffusion process for the other pixel neighbors of the ith pixel location;

continuing the error diffusion process for the (i+1)th pixel location and so forth, such that coding errors are diffused from substantially all of the pixel locations in a scanned image; and retaining images for display on a selected medium by digital halftone printing based upon intensity values of pixel locations that have been modified by error diffusion.

3. A digital halftoning process with random error diffusion for reducing visually apparent artifacts in images that are produced by digital halftone image enhancement, comprising the steps of:

detecting intensity values at selected pixel locations in an image;

for a first selected pixel location, encoding the pixel location as one binary value when the detected intensity value at the location is less than a predetermined threshold value, and assigning an error value to the pixel location equal to the detected intensity value;

when the detected intensity value at the first selected pixel location is greater than the threshold value, encoding the pixel location as a second binary value and calculating an error value for that location that equals the detected intensity value less the upper limit of the intensity scale;

randomly choosing a first neighbor to the first pixel location from a predetermined set of neighboring pixels;

for the first randomly chosen neighbor, assigning a weighting factor which is randomly selected;

randomly choosing other neighbors to the first pixel location from the first predetermined set, and assigning weighting factors to those locations that are randomly selected;

for the selected pixel neighbors, diffusing error values as follows:

$$e_j = (w_j) E_i$$

where $e_j$ is the error value diffused to the jth pixel neighbor from the ith pixel where the jth pixel neighbor is randomly determined from a predetermined set of pixels neighboring the ith pixel, $w_j$ is the weight determined for the jth pixel location, and $E_i$ is the error value assigned to the ith pixel location;

assigning revised gray-scale values to the selected neighbor pixels such that the revised gray-scale values equal the detected gray-scale values plus the diffused gray-scale values; and retaining images for display on a selected medium by digital halftone image enhancement based upon intensity values of pixel locations that have been modified by error diffusion.

4. Apparatus for image enhancement with error diffusion comprising:

means for detecting gray-scale values at preselected pixel locations in an image;

means for determining upper and lower limits of a range function which depends on the detected gray-scale values for each detected gray-scale value at the preselected pixel locations;

means for selecting first and second values which are randomly located between the upper and lower limits of the range function for each detected gray-scale value at the preselected pixel locations, and assigning a third error value for the preselected pixel location equal to its detected gray-scale value multiplied by 1 minus the sum of the first of the selected randomly located values and the second of the selected randomly located values;

means for determining if the detected gray-scale value at a preselected pixel location is less than a predetermined threshold value;

means for encoding the pixel location as a binary zero if the detected gray-scale value at a preselected pixel location is less than a predetermined threshold value;

means for assigning a first error value for the preselected pixel location equal to its detected gray-scale value multiplied by the first of the selected randomly located values if the detected gray-scale value at a preselected pixel location is less than a predetermined threshold value;

means for assigning a second error value for the preselected pixel location equal to its detected gray-scale value multiplied by the second of the selected randomly located values if the detected gray-scale value at a preselected pixel location is less than a predetermined threshold value;

means for determining if the detected gray-scale value at a preselected pixel location is greater than the threshold value;

means for encoding the pixel location as a binary one if the detected gray-scale value at a preselected pixel location is greater than the threshold value;

means for assigning a first error value for the preselected pixel location which equals the first of the selected randomly located values multiplied by a quantity equal to the detected gray-scale value less 255 if the detected gray-scale value at a preselected pixel location is greater than the threshold value;

means for assigning a second error value for the preselected pixel location which equals the second of the selected randomly located values multiplied by a quantity equal to the detected gray-scale value less 255, and assigning a third error value for the preselected pixel location equal to its detected gray-scale value less 255 multiplied by 1 minus the sum of the first of the selected randomly located values and the second of the selected randomly located values;

if the detected gray-scale value at a preselected pixel location is greater than the threshold value;

means for distributing the first and second assigned error values to at least three adjacent preselected pixel locations, one of which lies on the same line as the preselected pixel location and the other two of which are on an adjacent line for each preselected pixel location; and means for retaining images for display on a selected medium based upon values of the preselected pixel locations that have been encoded after distribution of the assigned error values.

5. An apparatus for digital halftoning with random error diffusion to reduce visually apparent artifacts in images that are produced by digital halftone image enhancement comprising:

means for detecting intensity values at selected pixel locations in an image;

means for encoding selected ones of the pixel locations as one binary value when the detected intensity value at a location is less than a predetermined threshold value;

means for calculating error values for such pixel locations that equal the detected intensity values;

means for encoding selected other ones of the pixel locations as a second binary value when the detected intensity values at those locations are greater than the predetermined threshold value;

means for calculating error values for those locations that equal the detected intensity values less the upper limit of the intensity scale;

means for diffusing the calculated error value, $E_i$, of the ith pixel location to its selected neighbors for selected pixel neighbors of the ith pixel in an image, as follows:

$$e_j = (w_j) E_i$$

where $e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location;

means for continuing the error diffusion process for the other pixel neighbors of the ith pixel location;

means for continuing the error diffusion process for the (i+1)th pixel location and so forth, such that coding errors are diffused from substantially all of the pixel locations in a scanned image; and means for retaining images for display on a selected medium by digital halftone image enhancement based upon intensity values of pixel locations that have been modified by error diffusion.

6. An apparatus for digital halftoning image enhancement with random error diffusion for reducing visually apparent artifacts in images that are produced by digital halftone image enhancement comprising:

means for detecting intensity values at selected pixel locations in an image;

means for encoding the pixel location as one binary value when the detected intensity value at the location is less than a predetermined threshold value for a first selected pixel location;

means for assigning an error value to the pixel location equal to the detected intensity value for a first selected pixel location;

means for determining when the detected intensity value at the first selected pixel location is greater than the threshold value;

means for encoding the pixel location as a second binary value and calculating an error value for that location that equals the detected intensity value less the upper limit of the intensity scale when the detected intensity value at the first selected pixel location is greater than the threshold value;

means for randomly choosing a first neighbor to the first pixel location from a predetermined set of neighboring pixels;

means for assigning a weighting factor which is randomly selected for the first randomly chosen neighbor;

means for randomly choosing other neighbors to the first pixel location from the first predetermined set;

means for assigning weighting factors to those locations that are randomly chosen;

means for diffusing error values for the selected pixel neighbors, as follows:

$$e_j = (w_j) E_i$$

where $e_j$ is the error value diffused to the jth pixel neighbor from the ith pixel where the jth pixel neighbor is randomly determined from a predetermined set of pixels neighboring the ith pixel, $w_j$ is the weight determined for the jth pixel location, and $E_i$ is the error value assigned to the ith pixel location;

means for assigning revised gray-scale values to the selected neighbor pixels such that the revised gray-scale values equal the detected gray-scale values plus the diffused gray-scale values; and means for retaining images for display on a selected medium by digital halftone image enhancement based upon intensity values of pixel locations that have been modified by error diffusion.

* * * * *